(No Model.)
A. J. MARSCHALL & C. NIELSEN.
CORN HOLDER.
No. 594,958. Patented Dec. 7, 1897.
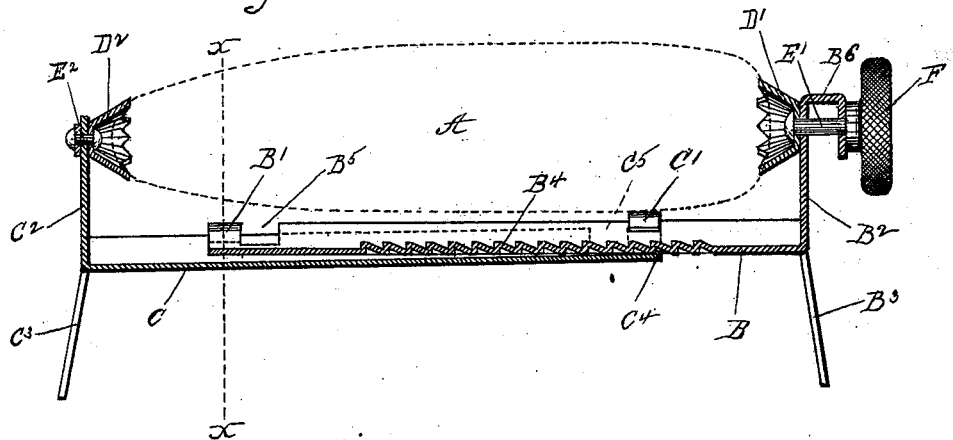
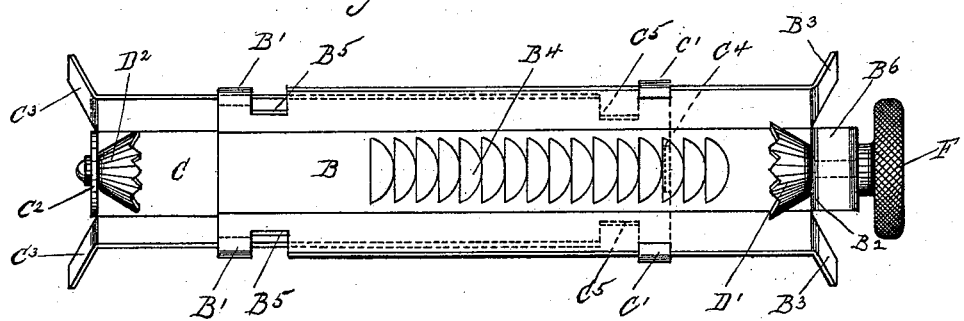
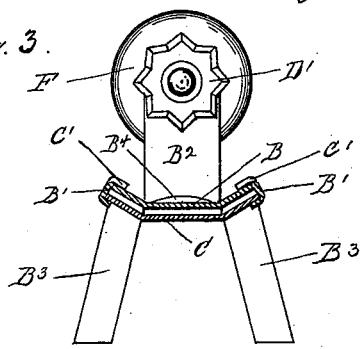
Witnesses:
Allan G. Harcourt
John B. McGuire
Inventors:
Charles Nielsen
Adolf J. Marschall
By C. J. Lundstrom
Attorney

UNITED STATES PATENT OFFICE.

ADOLF JOHANNES MARSCHALL AND CHARLES NIELSEN, OF LITTLE FALLS, NEW YORK.

CORN-HOLDER.

SPECIFICATION forming part of Letters Patent No. 594,958, dated December 7, 1897.

Application filed May 1, 1897. Serial No. 634,682. (No model.)

*To all whom it may concern:*

Be it known that we, ADOLF JOHANNES MARSCHALL and CHARLES NIELSEN, subjects of the King of Denmark, residing at Little Falls, in the county of Herkimer and State of New York, have invented certain new and useful Improvements in Corn-Holders, of which the following is a specification.

This invention relates to an improvement in devices for holding ears of corn which are commonly served hot at the table; and the objects of our invention are to provide a simple and inexpensive corn-holder which may be easily and conveniently manipulated and prevent the ear of corn or any butter or salt that may have been applied to same from coming in contact with the fingers or the table-cloth. We attain these objects by the construction illustrated in the accompanying drawings, in which—

Figure 1 is a longitudinal section of the invention. Fig. 2 is a plan view of the same. Fig. 3 is a cross-section taken through line X X, Fig. 1.

Similar letters refer to similar parts throughout the several views.

A represents an ear of corn.

B and C represent two similarly-bent sheet-metal slides adapted to slide one upon the other. The longitudinal side portions of each slide are bent at an angle to the central portion of same, so as to form a trough in cross-section, for the purpose hereinafter referred to. Adjacent to the inwardly-extending end portions of the slides are situated projecting lugs $B'$ and $C'$, which overlap the angular side portions of the slides, thus uniting the same and preventing any undue lateral movement of the slides. The lugs are made in such way as to permit of a slight vertical movement of the slides in order that they may tilt when the ear of corn is held by the device and to cause the locking device, hereinafter referred to, to operate.

$B^2$ and $C^2$ represent two heads, which are formed integral with the slides by bending the flat part of the outwardly-extending end portions of the slides upwardly at right angles to the main portions of the slides. The upper portion of the head $B^2$ is provided with a U-shaped bend $B^6$ for the purpose of providing an additional bearing for the shaft $E'$, which is revolubly mounted in that head.

$D'$ and $D^2$ represent two cups having serrated edges at their large ends. These cups are rigidly secured to shafts $E'$ and $E^2$, which are revolubly mounted in the heads of the slides.

F represents a knob or handle for operating the device. This handle is rigidly secured to the shaft $E'$ and causes the said shaft with its cup to partake of any movement imparted to the handle. In order to prevent the fingers from slipping when revolving the handle, the outer edge of the same is preferably roughened or corrugated.

$B^3$ and $C^3$ represent four legs or standards, which are formed integral with the slides by bending the angular sides at the outwardly-extending end portions of the slides downwardly.

The flat under side of the slide B is provided with a series of indentations $B^4$, with which an upwardly-projecting tongue $C^4$ on the slide C engages and locks the slides when an ear of corn is clamped between the two heads.

In order to enable one to separate the two slides for the purpose of cleaning the device, both slides are provided with slots $B^5$ and $C^5$, through which the lugs of the slides may easily drop out and the slides thus be disengaged.

In using the device the two slides are first pulled apart, so that the cups will extend beyond the ends of the corn. Then the slides are pressed together and the serrated edges of the cups caused to engage the ends of the ear of the corn and hold it suspended between the two heads. By clamping the ear of corn between the heads the slides will tilt and cause the tongue on the under slide to engage one of the indentations on the upper slide, thus locking the device and preventing the corn from becoming disengaged from the holder. By turning the handle the ear of corn is caused to revolve and may be easily and conveniently buttered and eaten without requiring to be touched by the hands. The ear of corn is held out of contact with the table-cloth by the legs or standards, and any surplus of butter or salt dropping from the ear of corn will be caught by the trough-shaped slides.

We are aware that many changes may be made in the construction of our improved corn-holder without departing from the spirit and scope of our invention—as, for instance, the slides may be provided with suitable depressions or ridges for the purpose of strengthening such portions of the slides as are subjected to great strain. The device may also be made of cast metal and differ somewhat in shape from the one herein shown and described, so as to suit the requirements of such manufacture, and for these reasons we do not desire to limit ourselves to any particular construction, but hold ourselves at liberty to make such changes as the state of the art may permit.

Having thus described our invention, what we claim as new, and desire to secure by Letters Patent, is—

1. In a corn-holder, the combination of two sheet-metal slides having their longitudinal side portions bent at an angle to their main portions, each of the slides being provided with two lugs running at right angle to the longitudinal direction of the slides and situated adjacent to the inwardly-extending end portions thereof, said lugs being adapted to overlap the longitudinal side portions of the slides and limit the lateral movements of the slides, two slots located on each slide adjacent to the said lugs, said slots being adapted to form an opening through which the lugs may drop out and disengage the slides, the outwardly-extending end portions of each slide being provided with an upwardly-directed head, and with two downwardly-directed legs or standards, the under side of the upper slide being provided with a series of indentations, an upwardly-directed tongue located at the inwardly-extending end of the under slide normally engaging said indentations and thus locking the slides, two cups having serrated edges at their large ends revolubly mounted in the heads, an operating-handle connected with one of the cups, substantially as described and for the purpose set forth.

2. A corn-holder comprising two trough-shaped metal slides, said slides being suitably joined together and capable of tilting in a vertical direction, the upper slide being provided with a series of indentations or notches, and the inwardly-extending end portion of the lower slide terminating in an upwardly-projecting tongue adapted to engage the said notches of the upper slide when the slides are caused to tilt, the outwardly-extending end portion of each slide being provided with an upwardly-directed head and means for supporting the slides, two cups or prongs mounted in said heads, one of said cups being provided with an operating-handle, substantially as described and for the purpose set forth.

ADOLF JOHANNES MARSCHALL.
CHARLES NIELSEN.

Witnesses:
ALLAN G. HARCOURT,
C. J. LUNDSTROM.